United States Patent
Coley et al.

(10) Patent No.: US 7,716,327 B2
(45) Date of Patent: May 11, 2010

(54) STORING DEPENDENCY AND STATUS INFORMATION WITH INCIDENTS

(75) Inventors: Brett A. Coley, Wake Forest, NC (US); Niraj P. Joshi, Cary, NC (US); Kenneth J. Parzygnat, Apex, NC (US); Wayne B. Riley, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 11/748,602

(22) Filed: May 15, 2007

(65) Prior Publication Data

US 2008/0288502 A1   Nov. 20, 2008

(51) Int. Cl.
G06F 15/173  (2006.01)
G06F 11/30  (2006.01)

(52) U.S. Cl. .................. 709/224; 709/223; 702/186
(58) Field of Classification Search ............. 709/243, 709/244; 702/186
See application file for complete search history.

(56) References Cited

U.S. PATENT DOCUMENTS

| | | | |
|---|---|---|---|
| 6,393,386 B1 | 5/2002 | Zager et al. | |
| 6,691,067 B1 | 2/2004 | Ding et al. | |
| 6,857,020 B1 | 2/2005 | Chaar et al. | |
| 6,895,586 B1 | 5/2005 | Brasher et al. | |
| 6,944,659 B2 | 9/2005 | Taggart et al. | |
| 6,983,321 B2 | 1/2006 | Trinon et al. | |
| 7,093,013 B1 | 8/2006 | Hornok, Jr. et al. | |
| 2002/0083169 A1 | 6/2002 | Aki et al. | |
| 2003/0187967 A1 | 10/2003 | Walsh et al. | |
| 2005/0097396 A1* | 5/2005 | Wood | 714/25 |
| 2005/0210133 A1 | 9/2005 | Florissi et al. | |
| 2006/0064481 A1* | 3/2006 | Baron et al. | 709/224 |
| 2007/0266138 A1* | 11/2007 | Spire et al. | 709/223 |

* cited by examiner

*Primary Examiner*—Quang N. Nguyen
*Assistant Examiner*—Nam Thai
(74) *Attorney, Agent, or Firm*—Scully, Scott, Murphy & Presser, P.C.; Carl Lanuti

(57) ABSTRACT

A method and system are disclosed for reporting incidents occurring during operation of a distributed computing environment including a multitude of hardware and software resources. The method comprises the steps of whenever a defined incident occurs, generating a respective one incident report; and keeping with each incident report, selected information relating to the incident. Preferably, this information that is kept with the incident report identifies (i) selected resources associated with the defined incident, and status of said selected resources at the time of the defined incident, (ii) dependencies among said selected resources at the time of the defined incident, and (iii) service level agreements and operating level agreements impacted by the defined incident.

3 Claims, 4 Drawing Sheets

○ Determine Business Impact ?-+

Search  Assess Failing  Assess Services  Assess SLA/OLA  Summary
        Components      Impacted ○ Context Assess Failing Component Results —302

Impacted:
  ⦿ Currently Impacted Only:
  ○ All (Potential Impact)

— Select Action — ▶ Go

| Select ⌄ | Name ⌄ | Status ⌄ | Type | Last Change ⌄ | Description ⌄ |
|---|---|---|---|---|---|
| ☑ | Online Banking App | ◇ Unknown | com.collation.platform.model.topology.app.application | | Internet application providing... |
| ☑ | Bulk Mail App | ◇ Unknown | com.collation.platform.model.topology.app.application | | Application providing function... |
| ☑ | Loan Processing App | ◇ Unknown | com.collation.platform.model.topology.app.application | | Application providing function... |
| ☑ | Internal Banking | ◇ Unknown | com.collation.platform.model.topology.sys.BusinessSystem | | All internal applications and... |
| ☑ | Banking | ◇ Unknown | com.collation.platform.model.topology.sus.BusinessSystem | | Top level business service con... |
| ☑ | Billing App | ◇ Unknown | com.collation.platform.model.topology.app.application | | Application providing function... |
| ☑ | ATM Processing App | ◇ Unknown | com.collation.platform.model.topology.app.application | | Monitors and provides access t... |
| ☑ | External Banking | ◇ Unknown | com.collation.platform.model.topology.sys.BusinessSystem | | All customer facing banking ap... |

Page 1 of 1:   Total : 8 Displayed: 8

< Back  Next >  Finish

Visualization on incident in historical context: Resources are shown using the tab selection to the left, and in this example, only a single status value, at time of incident creation, is available.

FIG. 3

STORING DEPENDENCY AND STATUS INFORMATION WITH INCIDENTS

BACKGROUND OF THE INVENTION

1. Field of the Invention

The present invention generally relates to distributed or enterprise computing systems, and more particularly, to incident reporting in such systems.

2. Background Art

The data processing resources of business organizations are increasingly taking the form of a distributed computing environment in which data and processing are dispersed over a network comprising many interconnected, heterogeneous, geographically remote computers. Such a computing environment is commonly referred to as an enterprise computing environment, or simply an enterprise. Managers of the enterprise often employ software packages known as enterprise management systems to monitor, analyze, and manage the resources of the enterprise. Enterprise management systems may provide for the collection of measurements, or metrics, concerning the resources of individual systems.

In enterprise systems, various types of reports are commonly generated. For example, some reports may be generated at regular intervals, such as daily or weekly, to record activities and use of resources of the enterprise. Other reports may be generated when certain specified or defined incidents or events occur. Such reports, referred to as incident reports or incidents, may be generated when certain changes are requested or made or when error or fault or other types of conditions are detected that require the attention of an administrator or that, for other reasons, need to be recorded. These incident reports may be created, for example, by a service desk that services or administers the enterprise, or in a change management database (CMDB).

Incident Reports created in Service Desks or Change Management Databases (CMDB) lack critical pieces of information. This information that is lacking includes the resource dependencies identified as potential causes of the incident, and the status that the monitoring sources were reporting for those resources at the time the incident was created, the business services, applications or processes that depend upon those resources and SLA or OLA information associated with the resources, services, applications or processes. Without this information, the incident report is not able to accurately provide a snapshot of what was occurring in the enterprise when the incident report was created. This information is extremely valuable when attempting to resolve the incident (at a point in time that is after the incident was created and things in the enterprise may have changed) and in the ITIL Problem Management process when performing root cause analysis.

SUMMARY OF THE INVENTION

An object of this invention is to improve incident reporting in enterprise computing environments.

Another object of the present invention is to keep with an incident record, which is generated in an enterprise-computing environment, information that provides a snapshot of what was occurring in the enterprise at the time the incident record was created.

These and other objectives are attained with a method and system for reporting incidents occurring during operation of a distributed computing environment including a multitude of hardware and software resources, and wherein said distributed environment provides a multitude of services to a multitude of clients pursuant to service level agreements and operating level agreements, and wherein during operation of the distributed computing environment defined incidents occur. The method comprises the steps of whenever one of said defined incidents occur, generating a respective one incident report; and keeping with each incident report, selected information relating to the incident.

Preferably, this information that is kept with the incident report identifies (i) selected resources associated with said one of the defined incidents, and status of said selected resources at the time of said one of the defined incidents, (ii) dependencies among said selected resources at the time of the one of the defined incidents, and (iii) service level agreements and operating level agreements impacted by said one of the defined incidents.

The preferred embodiment of the invention provides a model design for keeping information with an incident record that provides a snapshot of what was occurring in the enterprise at the time the incident was created. This preferred embodiment also enables visualizing that information.

Core points of the present invention are to keep resources and their status; to keep service, application, etc, dependencies on those resources and their status; and to keep service level agreements (SLA), operating level agreements (OLA), (UC), and associated status.

The present invention provides a number of important advantages. With this invention, relationships between incidents and resources may be used to find patterns of repeating or similar failures. This can also be used for preventative action, for example, identifying sets of similarly related resource that may be susceptible to problems. Also, a status snapshot gives immediate insight into problem symptoms. Another significant advantage is that the use of a single repository of information simplifies reporting or other presentation of incident information.

Further benefits and advantages of this invention will become apparent from a consideration of the following detailed description, given with reference to the accompanying drawings, which specify and show preferred embodiments of the invention.

BRIEF DESCRIPTION OF THE DRAWINGS

FIGS. 3 and 4 illustrate incident reports in accordance with the present invention and as displayed on a computer monitor.

DETAILED DESCRIPTION OF THE PREFERRED EMBODIMENTS

Figure 1:
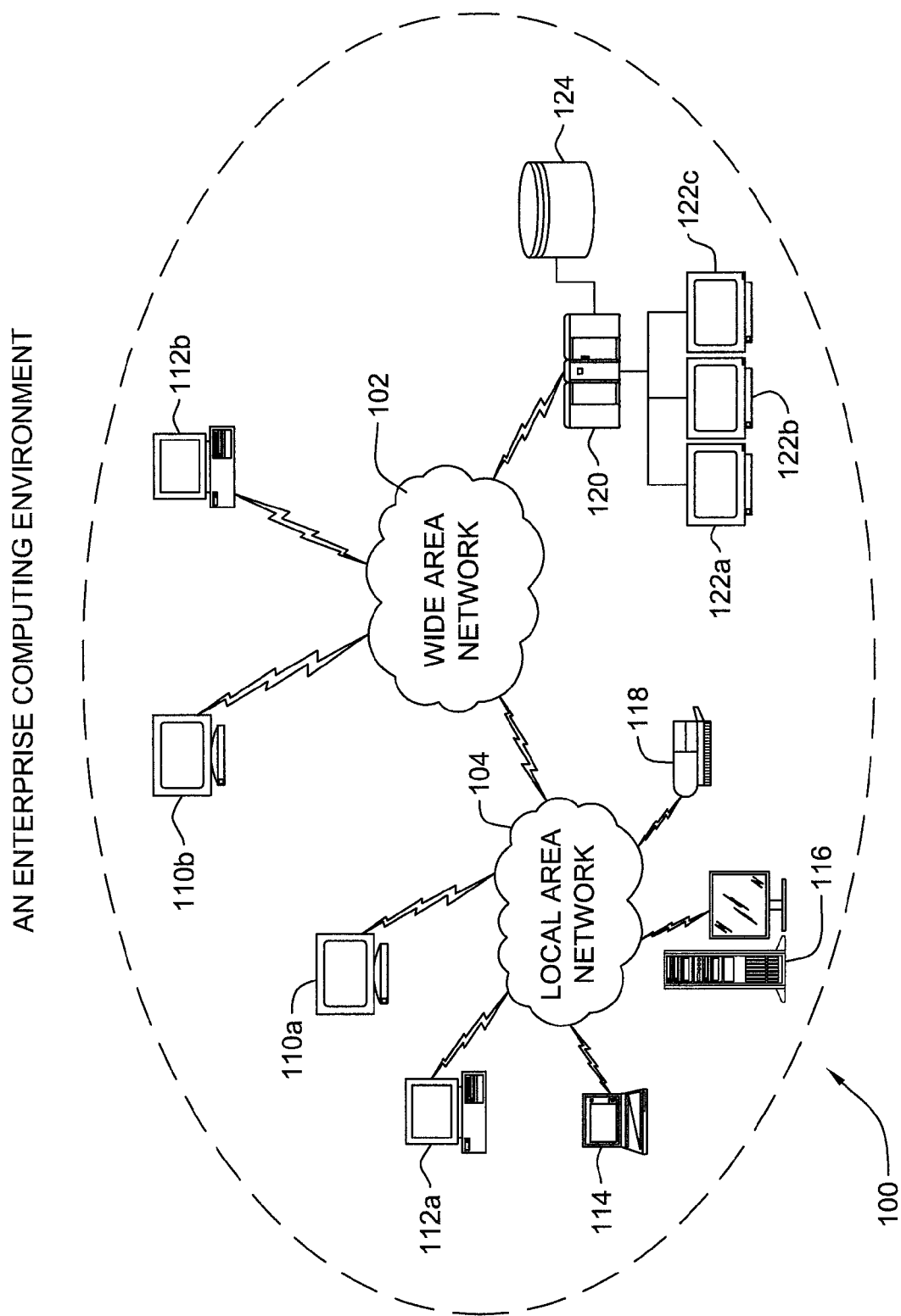
FIG. 1 illustrates an enterprise-computing environment.

FIG. 1 illustrates an enterprise-computing environment 100 in which the present invention may be implemented. An enterprise 100 comprises a plurality of computer systems, which are interconnected through one or more networks. Although one particular embodiment is shown in FIG. 1, the enterprise 100 may comprise a variety of heterogeneous computer systems and networks which are interconnected in a variety of ways and which run a variety of software applications.

One or more local area networks (LANs) 104 may be included in the enterprise 100. A LAN 104 is a network that spans a relatively small area. Typically, a LAN 104 is confined to a single building or group of buildings. Each node (i.e., individual computer system or device) on a LAN 104 preferably has its own CPU with which it executes programs, and each node is also able to access data and devices anywhere on the LAN 104. The LAN 104 thus allows many users to share devices (e.g., printers) as well as data stored on file servers. The LAN 104 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves). As illustrated in FIG. 1, the enterprise 100 includes one LAN 104. However, in alternate embodiments the enterprise 100 may include a plurality of LANs 104, which are coupled to one another through a wide area network (WAN) 102. A WAN 102 is a network that spans a relatively large geographical area.

Each LAN 104 comprises a plurality of interconnected computer systems and optionally one or more other devices: for example, one or more workstations 110a, one or more personal computers 112a, one or more laptop or notebook computer systems 114, one or more server computer systems 116, and one or more network printers 118. As illustrated in FIG. 1, the LAN 104 comprises one of each of computer systems 110a, 112a, 114, and 116, and one printer 118. The LAN 104 may be coupled to other computer systems and/or other devices and/or other LANs 104 through a WAN 102.

One or more mainframe computer systems 120 may optionally be coupled to the enterprise 100. As shown in FIG. 1, the mainframe 120 is coupled to the enterprise 100 through the WAN 102, but alternatively one or more mainframes 120 may be coupled to the enterprise 100 through one or more LANs 104. As shown, the mainframe 120 is coupled to a storage device or file server 124 and mainframe terminals 122a, 122b, and 122c. The mainframe terminals 122a, 122b, and 122c access data stored in the storage device or file server 124 coupled to or comprised in the mainframe computer system 120.

The enterprise 100 may also comprise one or more computer systems, which are connected to the enterprise 100 through the WAN 102: as illustrated, a workstation 110b and a personal computer 112b. In other words, the enterprise 100 may optionally include one or more computer systems, which are not coupled to the enterprise 100 through a LAN 104. For example, the enterprise 100 may include computer systems that are geographically remote and connected to the enterprise 100 through the Internet.

In the operation of enterprise 100, various services are provided to various clients. In this operation, resources, including hardware and software, are utilized, may be assigned to individual clients, and may work together. The effectiveness of one resource or service may depend on the availability or effectiveness of other resources, a feature referred to as dependencies. Also, the clients may be provided with the services and resources pursuant to a service level agreement (SLA) or an operating level agreement (OLA) that may specify operating criteria, standards or targets.

The operation of enterprise 100 is monitored in order to provide better operation and management of the enterprise. During this monitoring, if any problem is found, necessary measures may be taken, such as changing some setup parameter.

As mentioned above, in enterprise systems, various types of reports are commonly generated. For example, some reports may be generated at regular intervals, such as daily or weekly, to record activities and use of resources of the enterprise. Other reports may be generated when certain specified or defined incidents or events occur. Such reports, referred to as incident reports or incidents, may be generated when certain changes are requested or made or when error or fault or other types of conditions are detected that require the attention of an administrator or that, for other reasons, need to be recorded. These incident reports may be created, for example, by a service desk that services or administers the enterprise, or in a change management database (CMDB).

As mentioned above, Incident Reports created in Service Desks or Change Management Databases (CMDB) lack critical pieces of information. This information that is lacking includes the resource dependencies identified as potential causes of the incident, and the status that the monitoring sources were reporting for those resources at the time the incident report was created, the business services, applications or processes that depend upon those resources and SLA or OLA information associated with the resources, services, applications or processes. Without this information, the incident report is not able to accurately provide a snapshot of what was occurring in the enterprise when the incident report was created. This information is extremely valuable when attempting to resolve the incident (as a point in time that is after the incident was created and things in the enterprise may have changed) and in the ITIL Problem Management process when performing root cause analysis.

In accordance with the present invention, information is kept with an incident report that provides a snapshot of what was occurring in the enterprise at the time the incident was created. In particular, this information that is kept with the incident report includes (i) resources and their status, (ii) service, application, etc. dependencies on those resources and their statue, and (iii) SLA. OLA, UC and associated status.

Figure 2:
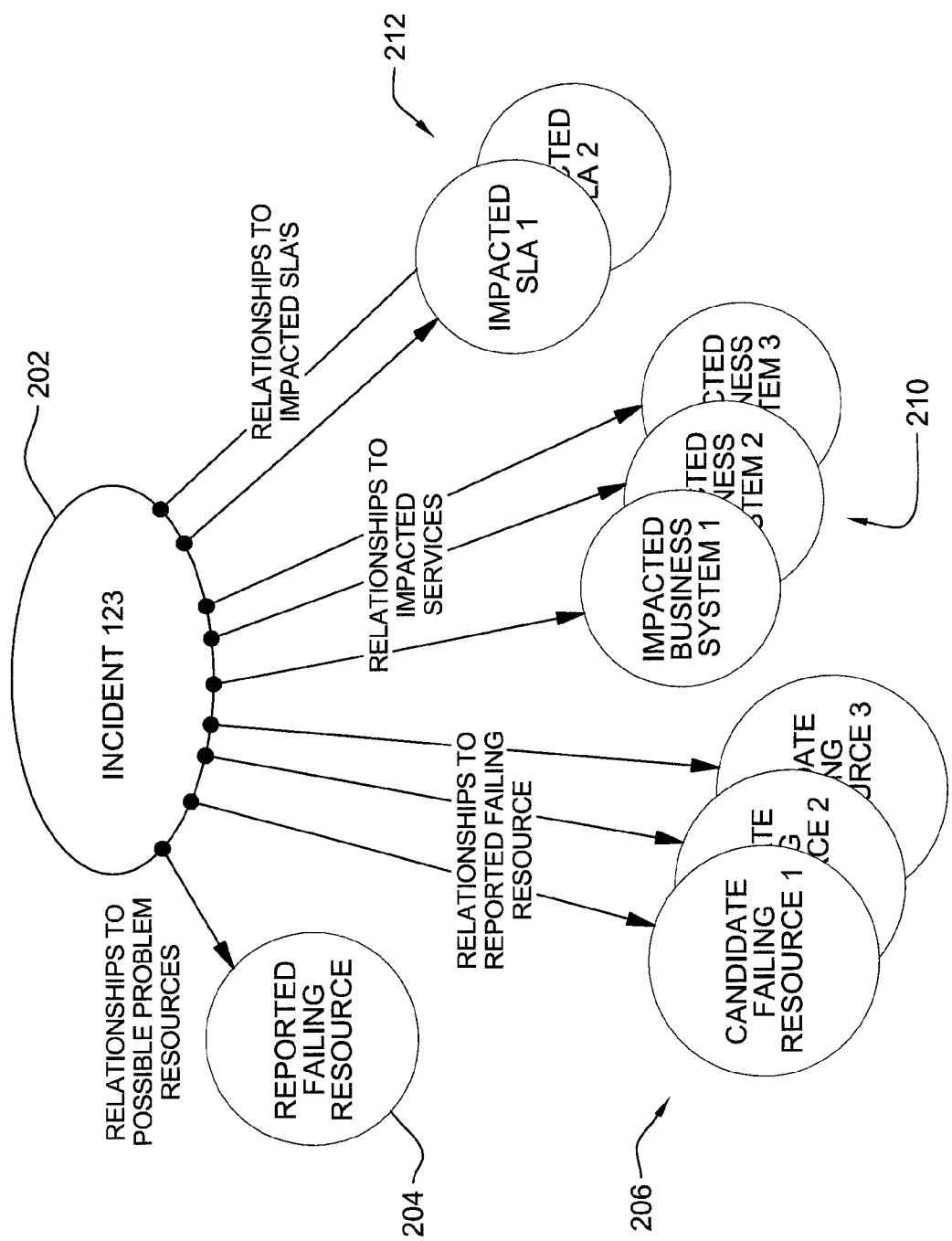
FIG. 2 describes the relationships between an incident report and actual resources in an enterprise-computing environment.

With reference to FIG. 2, incidents can be created in a change management database (CMDB) as a specific type of resource, represented at 202. Special relationships from the incident resource to the actual resources represent the following types of dependencies: Report Failing Component 204; Candidate Failing Component 206; Actual Failing Component; Impacted Business system 210; and Impacted Service Level Agreement 212.

Status information can be stored in a database. The database structure allows for multiple status observations for a given resource, as a resource may be monitored by multiple management software systems at a given point in time. These status observations can be created automatically at incident creation time and as other incident-related activity occurs, or manually as desired by an operator during various phases of problem determination.

Figure 4:
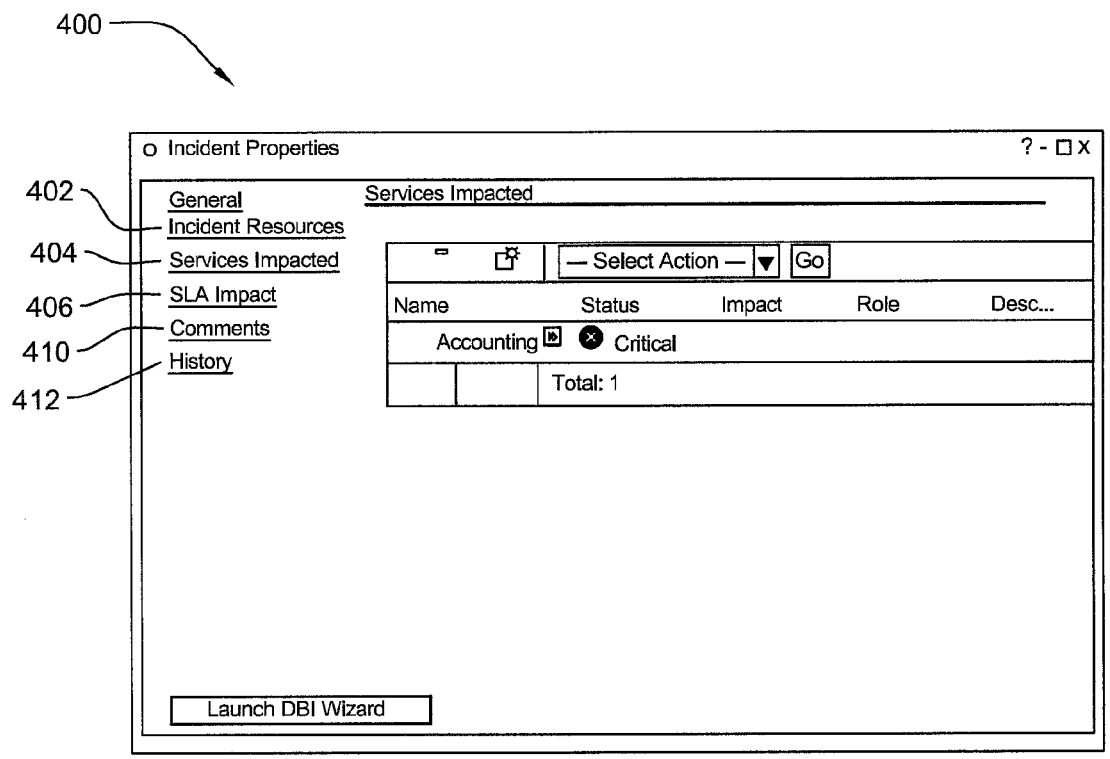

The preferred embodiment of the present invention also provides visualization of incident creation, for example as shown in FIGS. 3 and 4. FIG. 3 shows a current view of an environment. The banner 302 along the top of the Figure represents a navigation bar which allows one to select the view of "Failing Components," Impacted Services," and "Impacted SLAs/OLAs." The screen shown in FIG. 3 is a UI that is used to find the original related resources, services and SLAs. Each step in the navigation builds on information from the previous step. For example, the impacted services are derived from the failing components identified in the previous step. The last step will create the incident and save these values.

FIG. 4 illustrates a visualization of an incident in a historical context, and is used to look back at an incident and its relationships. FIG. 4 shows a screen 400 that lists a number of topics including incident resources 402, services impacted 404, SLA impact 406, comments 410 and history 412. Each of these listings acts as a link that may be used to access more information about the listed topic.

As will be readily apparent to those skilled in the art, the present invention, or aspects of the invention, can be realized in hardware, software, or a combination of hardware and software. Any kind of computer/server system(s)—or other apparatus adapted for carrying out methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

Figure 5:
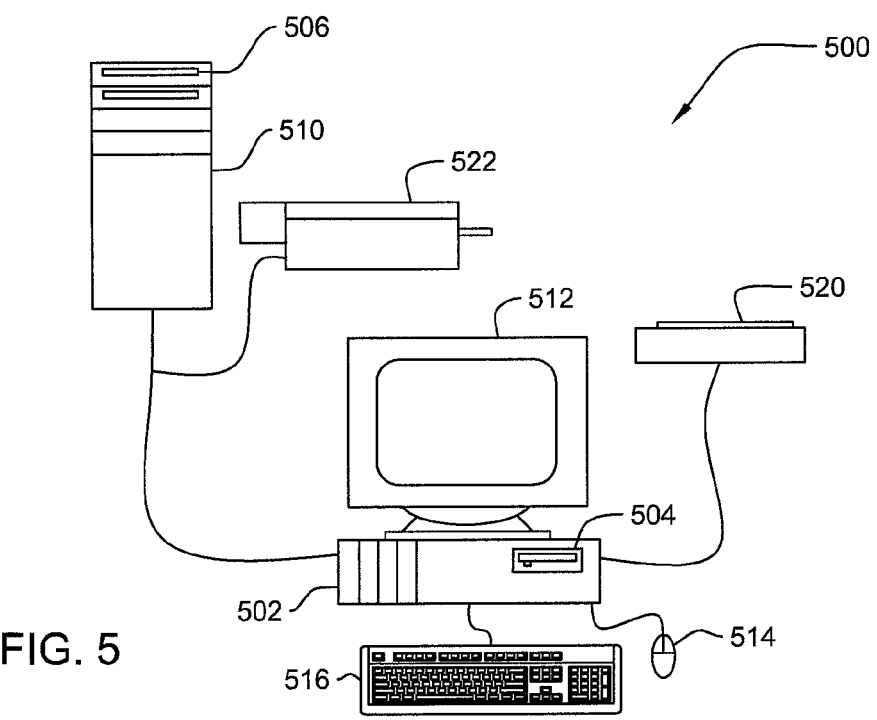
FIG. 5 shows a computer system that may be used to implement this invention.

For example, FIG. 5 illustrates a computer system 500 which may be used in the implementation of the present invention may be carried out. Computer system includes a processing unit 502 that houses a processor, memory and other systems components that implement a general purpose processing system that may execute a computer program product comprising media, for example a floppy diskette that may be read by processing unit 502 through floppy drive 504.

The program product may also be stored on hard disk drives within processing unit 502 or may be located on a remote system 506 such as a server 510, coupled to processing unit 502, via a network interface, such as an Ethernet interface. Monitor 512, mouse 514 and keyboard 516 are coupled to processing unit 502, to provide user interaction. Scanner 520 and printer 522 are provided for document input and output. Printer 522 is shown coupled to processing unit 502 via a network connection, but may be coupled directly to the processing unit. Scanner 520 is shown coupled to processing unit 502 directly, but it should be understood that peripherals may be network coupled or direct coupled without affecting the ability of workstation computer 500 to perform the method of, or aspects of, the invention.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of reporting incidents occurring during operation of a distributed computing environment including a multitude of hardware and software resources, and wherein said distributed environment provides a multitude of services to a multitude of clients pursuant to service level agreements and operating level agreements, and wherein during operation of the distributed computing environment defined incidents occur, the method comprising the steps of:

whenever one of the defined incidents occur, generating a respective one incident report;

keeping with each incident report, information identifying selected resources associated with said one of the defined incidents, and status of said selected resources at the time of said one of the defined incidents, dependencies among said selected resources at the time of said one of the defined incidents, and service level agreements and operating level agreements impacted by said one of the defined incidents;

using relationships between incidents and resources, as reported on the incident reports, to find patterns of repeating failure of resources of the distributed computing environment; and using said relationships between the incidents and resources, as reported on the incident reports, to identify sets of resources similar to the resources reported on the incident reports but not on the incident reports, that may be susceptible to problems;

wherein said relationships between the incidents and resources and said hardware and software resources represent a. Report Failing Component dependencies,
b. Candidate Failing Component dependencies,
c. Actual Failing Component dependencies,
d. Impacted Business system dependencies, and
e. Impacted Service Level Agreement dependencies;

said Impacted Service Level Agreement dependencies are derived from the Actual Failing Component dependencies.

2. The method according to claim 1, wherein the keeping step includes the step of identifying on said each incident report:

reported failing components;
candidate failing components;
actual failing components; and
impacted business systems.

3. The method according to claim 2, comprising the further step of displaying said incident reports on a computer monitor.

* * * * *